US008215358B2

(12) United States Patent
Donahue et al.

(10) Patent No.: US 8,215,358 B2
(45) Date of Patent: Jul. 10, 2012

(54) STEAM CORRUGATOR SYSTEM

(75) Inventors: John L. Donahue, Cape Coral, FL (US); Robin A. Sommers, Liberty Township, OH (US); D. Shawn Pearson, Amelia, OH (US)

(73) Assignee: Donahue & Associates International, Inc., Milford, OH (US)

( * ) Notice: Subject to any disclaimer, the term of this patent is extended or adjusted under 35 U.S.C. 154(b) by 761 days.

(21) Appl. No.: 12/060,896

(22) Filed: Apr. 2, 2008

(65) Prior Publication Data

US 2008/0236759 A1 Oct. 2, 2008

Related U.S. Application Data

(60) Provisional application No. 60/909,493, filed on Apr. 2, 2007.

(51) Int. Cl.
*B32B 41/00* (2006.01)

(52) U.S. Cl. ........... 156/367; 156/368; 60/297; 100/153

(58) Field of Classification Search .................. 156/367, 156/368, 462; 60/297; 100/153
See application file for complete search history.

(56) References Cited

U.S. PATENT DOCUMENTS

| | | | | | |
|---|---|---|---|---|---|
| 2,952,297 | A | * | 9/1960 | Hollis | 264/286 |
| 5,344,520 | A | * | 9/1994 | Seki et al. | 156/472 |
| 5,861,083 | A | * | 1/1999 | Klockenkemper et al. | 162/263 |
| 5,865,369 | A | * | 2/1999 | Fisher et al. | 237/13 |
| 5,899,264 | A | * | 5/1999 | Marschke | 165/89 |
| 6,745,807 | B2 | * | 6/2004 | Ishibuchi et al. | 156/351 |

OTHER PUBLICATIONS

"Donahue Steam System and BHS Modul Facer," Donahue & Associates International, Inc. (Jul. 2004) pp. 1-3.

* cited by examiner

*Primary Examiner* — George Koch
(74) *Attorney, Agent, or Firm* — Frost Brown Todd LLC

(57) ABSTRACT

A system is configured to process steam. The system includes a steam supply line, a corrugator system, a heat sink, and one or more return lines. The corrugator system includes two corrugating rolls. The corrugating rolls each have a plurality of bores formed therethrough. The bores extend substantially longitudinally through the corrugating rolls. The heat sink is configured to draw steam through the corrugator system. The one or more return lines are in fluid communication with one or both of the corrugator system or the heat sink. The one or more return lines are configured to receive condensate communicated from one or both of the corrugator system or the heat sink. A steam trap assembly may also be positioned between the heat sink and a return line. The steam trap assembly may include a steam trap and a bypass line that is operable to selectively bypass the steam trap.

20 Claims, 2 Drawing Sheets

STEAM CORRUGATOR SYSTEM

PRIORITY

This application claims priority to U.S. provisional application Ser. No. 60/909,493, entitled "Steam Corrugator System," filed Apr. 2, 2007, the disclosure of which is incorporated by reference herein in its entirety.

BACKGROUND

Some embodiments of the present invention relate to a steam system with a corrugator that includes corrugating rolls or rollers, such as in a paper or cardboard or corrugated board processing setting. Corrugating rolls include but are not limited to those having siphon systems for removing condensate (e.g., condensate siphoned off from within a roller and fed into a trap) and those having a plurality of peripherally drilled bores therethrough. Some corrugating systems may incorporate siphon-type corrugating rolls only, bored corrugating rolls only, combinations of siphon-type and bored rolls, or any other type(s) of corrugating rolls. It will also be appreciated that steam and condensate may be processed in a variety of ways and using a variety of system components in a variety of settings. However, it is believed that no one prior to the inventors has made or used a system or process as described herein.

BRIEF DESCRIPTION OF THE DRAWINGS

The accompanying drawings incorporated in and forming a part of the specification illustrate several aspects of the present invention, and together with the description serve to explain the principles of the invention; it being understood, however, that this invention is not limited to the precise arrangements shown. In the drawings, like reference numerals refer to like elements in the several views. In the drawings.

Reference will now be made in detail to various embodiments of the invention, examples of which are illustrated in the accompanying drawings. To the extent that specific dimensions are shown in the accompanying drawings, such dimensions should be regarded as merely illustrative and not limiting in any way. Accordingly, it will be appreciated that such dimensions may be varied in any suitable way.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the descriptions should be regarded as illustrative in nature and not restrictive.

Figure 1:
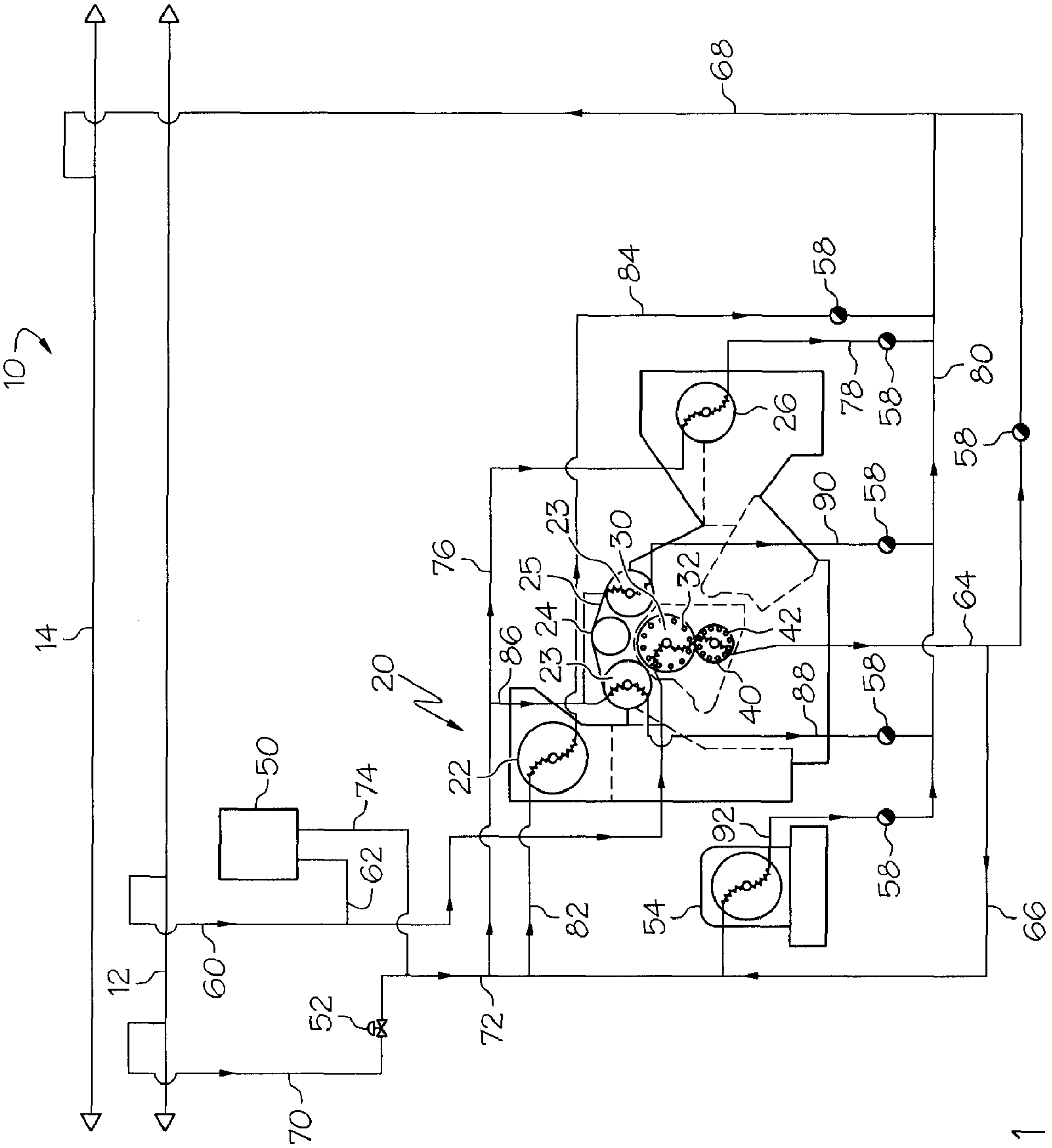
FIG. 1 depicts a schematic view of an exemplary steam processing system.

FIG. 1 shows an exemplary steam flow design for a corrugator system (10). In this example, the system (10) includes a Modul Facer corrugator (20) by BHS Corrugated Maschinen- und Anlagenbau GmbH of Weiherhammer, Germany. Of course, any other suitable corrugator or system components may be used, including but not limited to one or more doublefacers, one or more singlefacers, or otherwise. Corrugator (20) of the present example comprises an integral pre-heater (22), heated belt rolls (23), an integral pre-conditioner (26), a first drilled corrugating roll (30), and a second drilled corrugating roll (40). Alternatively, a corrugator (20) may have any other suitable components, in addition to or in lieu of components described herein, in any suitable arrangement. By way of example only, a corrugator (20) may include a plurality of integral pre-heaters (22), a plurality of pre-conditioners (26) (e.g., two pre-conditioners (26), etc.), several pairs of corrugating rolls (30, 40) (e.g., three pairs of corrugating rolls (30, 40), etc.), and/or substituting a pressure roll (e.g., a standard roll with a rotary joint and its own steam trap) in place of belt (25) and/or heated belt rolls (23), etc. For instance, where a pressure roll is used in place of a belt (25) and/or heated belt rolls (23), such a pressure roll may be constructed similar to a pre-heater and its line of contact may provide pressure to an upper corrugating roll (30). Furthermore, variations may include extra stand-alone rolls (30, 40) or vessels, stand-alone pre-heaters (22) (e.g., for heating liners, etc.), and/or stand-alone pre-conditioners (e.g., for heating mediums, etc.), among other components. Still other suitable variations will be apparent to those of ordinary skill in the art in view of the teachings herein.

Integral pre-heater (22) of this example comprises a steam-heated cylindrical steel roll. In use, the heated surface of the pre-heater (22) is in contact with paper (e.g., a liner) being fed through corrugator (20), thus transferring heat to the paper or liner. Such pre-heating of the paper or liner may improve production speeds or provide other results. The roll of pre-heater (22) may have any desired diameter and length. Alternatively, integral pre-heater (22) may have any other suitable features, components, or configurations. Furthermore, while pre-heater (22) is integral with the corrugator (20) in this example, pre-heater (22) may be separate from a corrugator (20) in other versions.

Heated belt rolls (23) of this example are in communication with a belt (25), which is in further communication with a guide or tension roll (24). Heated belt rolls (23) may be configured to heat belt (25) by transferring heat to belt (25) through direct contact. Tension roll (24) is not heated in this particular example, though it may be heated in other versions. While two heated belt rolls (23) are shown, any other suitable number of heated belt rolls (23) may be used. Furthermore, while both heated belt rolls (23) are heated in this example, some other versions may have only one or more than two belt rolls (23) heated. Alternatively, heated belt rolls (23) may have any other suitable features, components, or configurations associated with them.

Integral pre-conditioner (26) of this example comprises a steam-heated cylindrical steel roll. In use, the heated surface of the pre-conditioner (26) is in contact with paper being fed through corrugator (20) (e.g., a medium that may be formed into flutes by the corrugator (20)), thus transferring heat to the paper or medium. Such pre-heating or pre-conditioning of the paper or medium may improve production speeds or provide other results. The roll of pre-conditioner (26) may have any desired diameter and length. Alternatively, integral pre-conditioner (26) may have any other suitable features, components, or configurations. Furthermore, while pre-conditioner (26) is integral with the corrugator (20) in this example, pre-conditioner (26) may be separate from a corrugator (20) in other versions.

Corrugating rolls (30, 40) are piped in series in this example. First drilled corrugating roll (30) of this example includes a plurality of peripherally-drilled or rifle-drilled bores (32) extending longitudinally therethrough. Second drilled corrugating roll (40) also has a plurality of peripherally-drilled or rifle-drilled bores (42) extending longitudinally therethrough. The bores (32, 42) are located close to the outer surface of the corrugating rolls (30, 40) in this example. Such a location of bores (32, 42) may provide a relatively increased rate of heat transfer as well as increased production speeds, while correctly forming flutes in the medium. Alternatively, bores (32, 42) may have any other desired proximity to the outer surface of corrugating rolls (30, 40), and corrugating rolls (30, 40) may have any other suitable features, components, or configurations. As will be described in greater detail below, the steam output of corrugating rolls (30, 40) may be used to feed other rolls in the system (10) (e.g., integral pre-heaters, stand-alone pre-heaters, integral pre-conditioners, stand-alone pre-conditioners, heated belt rolls, other continuously heated rolls, etc.), while a steam trap (58) clears away liquid condensate.

The system (10) of the present example shown in FIG. 1 also includes a differential pressure controller (50), a pressure control valve (52), a stand-alone pre-heater (54), and several steam traps (58). Differential pressure controller (50) is configured to maintain a pressure differential across corrugating rolls (30, 40) to maintain a constant flow of steam and condensate through the rolls (30, 40) in this example. In other words, differential pressure controller (50) sets the pressure drop across corrugating rolls (30, 40). For instance, differential pressure controller (50) may maintain a differential set point by monitoring the corrugating roll (30, 40) supply and output steam pressures, and adjusting control valve (52) accordingly. Differential pressure controller (50) may be electrical, mechanical, electromechanical, and/or may comprise any suitable one or more components. Of course, a differential pressure controller (50) may come in a variety of other forms, may be used to serve a variety of alternative functions, and other components may be used in addition to or in lieu of a differential pressure controller (50). Alternatively, a system (10) may lack a differential pressure controller (50) altogether.

Pressure control valve (52) comprises a conventional steam rated flow control valve in this example, though any other suitable type of valve may be used. For instance, pressure control valve (52) may comprise a pressure regulating valve with a pneumatic, electrical, or other type of actuator allowing remote and/or automatic adjustment. Pressure control valve (52) is operable to add or otherwise adjust pressure of steam to corrugator (20), such as when the differential pressure exceeds a set point. To accomplish this, pressure control valve (52) is in communication with the differential pressure controller (50) in this example. In particular, an actuator in pressure control valve (52) receives a control signal from differential pressure controller (50), directly or indirectly, and adjusts the valve position accordingly. Pressure control valve (52) may open to allow more steam into corrugator (20) when the differential pressure is too great; or may close to decrease steam flow when the differential pressure is too low. The valve may be fully open, fully closed, or at any position in between, and may move in accordance with instructions from the differential pressure controller (50).

Figure 2:
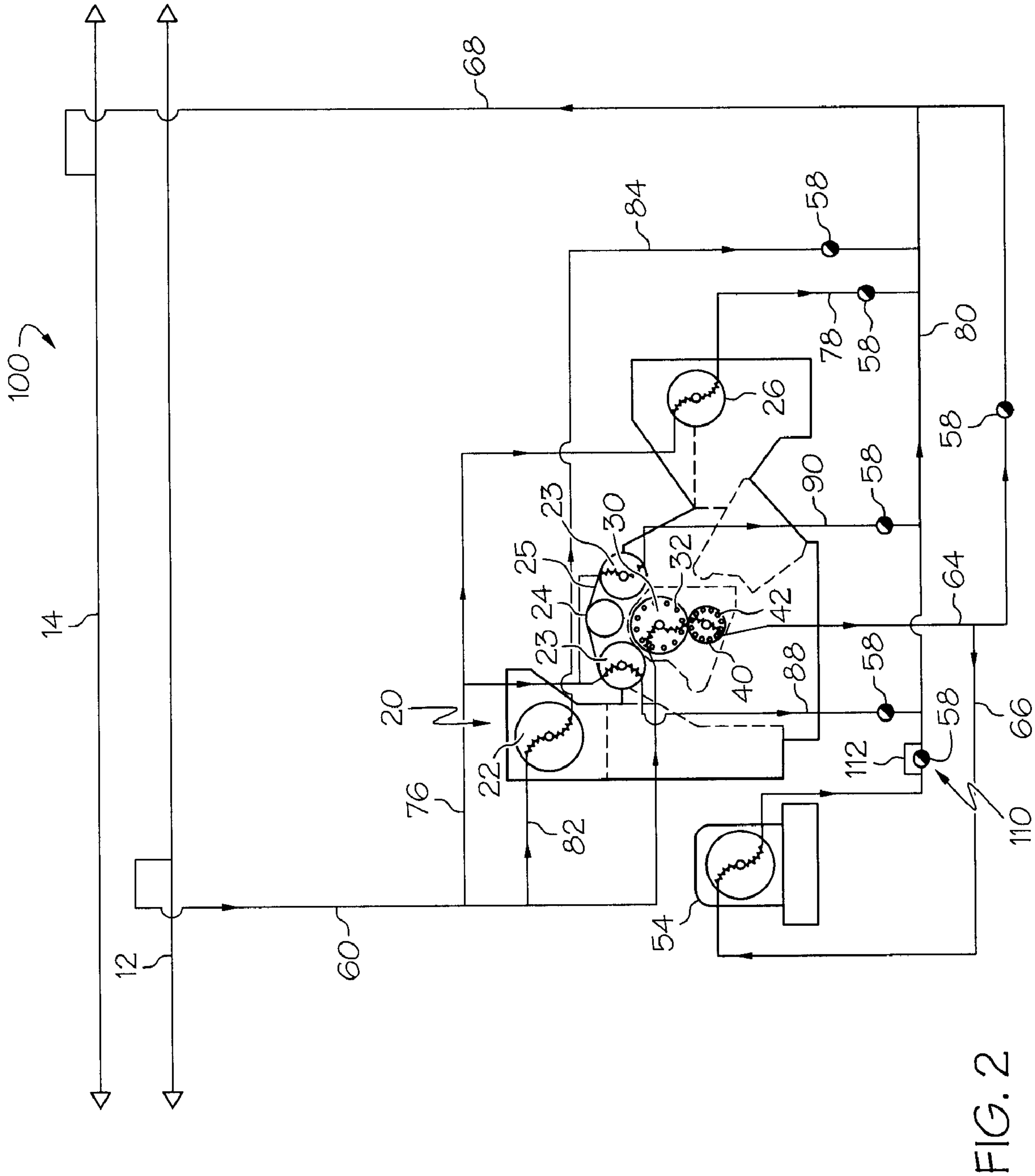
FIG. 2 depicts a schematic view of another exemplary steam processing system.

By way of example only, when the main line steam pressure is 175 psig and the differential pressure set point is 35 psig, all the other rolls on the machine may be at 140 psig—a pressure below what some may consider to be the lower limit for production. For instance, in some situations, some may consider it undesirable for pressures to drop below 150 psig. It will be appreciated, however, that such pressure levels may be acceptable in some circumstances or settings. As shown in FIG. 2 and described in greater detail below, however, a pressure control valve (52) may be omitted if desired.

Stand-alone pre-heater (54) of the present example has a diameter of approximately 36 inches, though any other suitable dimensions may be used (e.g., 42 inches, etc.). Stand-alone pre-heater (54) may act as a "heat sink" that draws steam through corrugating rolls (30, 40) when corrugating rolls (30, 40) are under a load (e.g., when running paper, etc.). By way of example only, a stand-alone pre-heater (54) acting as a "heat sink" may provide a desirable additional pressure differential, such as to pull steam through system (10). Alternatively, any other suitable roll, vessel, or component may be used (as a heat sink or otherwise), including but not limited to a pre-conditioner (integral or non-integral with corrugator (20)), a pre-heater (integral or non-integral with corrugator (20)), a belt roll (integral or non-integral with corrugator (20)), or a heated roll on a nearby singlefacer. Alternatively, a corrugating roll pre-heat station, a mixing tank, a steam cleaning wand, a steam shower, a heat exchanger, and/or steam jet pump may be used as a heat sink or otherwise in system (10). Other suitable types of rolls, vessels, or other components will be apparent to those of ordinary skill in the art in view of the teachings herein. Furthermore, it may also be possible to use more than one roll or vessel. It may be possible to use a separate piece of steam heated equipment as the "heat sink." By way of example only, possibilities may include a corrugating roll preheat station, mixing tank, steam cleaning wand, steam shower, heat exchanger and steam jet pump, among others. A steady load may be desirable in some settings.

In the present example, stand-alone pre-heater (54) is provided downstream of second corrugating roll (40). It will be appreciated, however, that stand-alone pre-heater (54) or some substitute thereof may be provided elsewhere within the system (10), either in addition to stand-alone pre-heater (54) being downstream of second corrugating roll (40) or as an alternative to the stand-alone pre-heater (54) being downstream of second corrugating roll (40). For instance, a second "heat sink" pre-heater may be fluidly coupled with first corrugating roll (30). Still other suitable locations for one or more pre-heaters or other components within a steam system (10), to provide a heat sink or to perform other functions, will be apparent to those of ordinary skill in the art in view of the teachings herein.

Steam traps (58) in this example is configured to prevent steam discharge from process equipment to maintain pressure and allow time for energy transfer; discharge condensate automatically to prevent accumulation; and vent air or other non-condensable gases to achieve maximum temperature at the operating steam pressure. A steam trap (58) may alternatively serve any other function(s). Steam traps (58) of the present example may include standard or customized steam traps by Donahue & Associates International, Inc. of Milford, Ohio, such as the DAII 26*e* or DAII 26*h* by way of example only. Such steam traps (58) may be in the form of duplex controlled float traps featuring a rolling ball valve mechanism. The rolling ball valve may be operated by a float and a thermostatic element. The float may travel with the condensate level inside the body of the steam trap (58). The thermostatic element may react to temperature as a function of the steam saturation curve. Alternatively, any other suitable steam trap (58) having any other desired features, components, and capabilities may be used. It will also be appreciated that a steam trap (58) may be used with or without a bypass pathway (e.g., as described below, etc.) or vent line. Steam traps (58) of the present example are configured to drain liquid condensate from lines with which they are coupled, as will be described in greater detail below. Alternatively, steam traps (58) may have any other suitable features, components, or configurations.

A main supply line (12) provides steam to the system (10) in this example, while a main return line (14) receives and communicates or conveys condensate from the system (10) in this example. Main supply line (12) may provide steam at approximately 175 psig, approximately 200 psig, approximately 220 psig, or approximately 230 psig, though any other suitable steam pressure may be used.

A first line (60) branches off from main supply line (12), and is in fluid communication with differential pressure controller (50) and with corrugator (20). In particular, a differential branch (62) extends from first line (60) to communicate with differential pressure controller (50), while first line (60) continues, reaching first corrugating roll (30). Steam is then communicated from first corrugating roll (30) to second corrugating roll (40). A mixture of steam and condensate is then communicated from second corrugating roll (40) via a second line (64). A pre-heater branch (66) extends from second line (64), and communicates with stand-alone pre-heater (54), as well as with fourth line (72) described below. Second line (64) continues past pre-heater branch (66), reaching a steam trap (58), which drains liquid condensate from second line (64). After passing through this steam trap (58), fluid (e.g., steam, air, etc.) is further communicated through return line (68) to reach main return line (14).

A third line (70) branches off from main supply line (12) in this example, and is in communication with pressure control valve (52). A fourth line (72) is coupled with the other side of pressure control valve (52). A differential branch (74) extends from fourth line (72) to communicate with differential pressure controller (50), while fourth line (72) continues, meeting up with pre-heater branch (66) to communicate with stand-alone pre-heater (54). Between differential branch (74) and stand-alone pre-heater (54), a pre-conditioner line (76) extends from fourth line (72). Pre-conditioner line (76) provides fluid communication from fourth line (72) to integral pre-conditioner (26) of corrugator (20). It will be appreciated in view of the teachings herein that, given the fluid communication between fourth line (72) and pre-heater branch (66), pre-conditioner line (76) may communicate steam that has been communicated through corrugating rolls (30, 40), by receiving such steam via second line (64) and pre-heater branch (66). Pre-conditioner line (76) may also communicate steam that has been communicated from third line (70) through pressure control valve (52). The extent to which either or both such potential sources (e.g., third line (70) and/or second line (64)) provide steam to pre-conditioner line (76) under a given set of conditions will be apparent to those of ordinary skill in the art in view of the teachings herein.

A fifth line (78) communicates fluid (e.g., steam) from the integral pre-conditioner (26) to a steam trap (58), which drains liquid condensate from fifth line (78). After passing through this steam trap (58), fluid (e.g., steam, air, etc.) is further communicated through a sixth line (80), which is coupled with return line (68), to reach main return line (14).

A pre-heater line (82) also extends from fourth line (72), between pre-conditioner line (76) and stand-alone pre-heater (54). Pre-heater line (82) provides fluid communication from fourth line (72) to integral pre-heater (22) of corrugator (20). It will be appreciated in view of the teachings herein that, given the fluid communication between fourth line (72) and pre-heater branch (66), pre- pre-heater line (82) may communicate steam that has been communicated through corrugating rolls (30, 40), by receiving such steam via second line (64) and pre-heater branch (66). Pre-heater line (82) may also communicate steam that has been communicated from third line (70) through pressure control valve (52). The extent to which either or both such potential sources (e.g., third line (70) and/or second line (64)) provide steam to pre-heater line (82) under a given set of conditions will be apparent to those of ordinary skill in the art in view of the teachings herein.

A seventh line (84) communicates fluid (e.g., steam) from the integral pre-heater (22) to a steam trap (58), which drains liquid condensate from seventh line (84). After passing through this steam trap (58), fluid (e.g., steam, air, etc.) is further communicated through sixth line (80), which is coupled with return line (68), to reach main return line (14).

As is also shown in FIG. 1, a belt roll feed line (86) branches off of pre-conditioner line (76). Belt roll feed line (86) is in fluid communication with heated belt rolls (23) with steam. Of course, a belt roll (23) may be heated using any other suitable medium, components, or techniques. An eighth line (88) and ninth line (90) communicate fluid (e.g., steam) from belt rolls (23) to respective steam traps (58). After passing through these steam traps (58), fluid (e.g., steam, air, etc.) is further communicated through sixth line (80), which is coupled with return line (68), to reach main return line (14). Similarly, a tenth line (92) communicates fluid (e.g., steam) from stand-alone pre-heater (54) to a steam trap (58). After passing through this steam trap (58), fluid (e.g., steam, air, etc.) is further communicated through sixth line (80), which is coupled with return line (68), to reach main return line (14).

It will be appreciated in view of the teachings herein that the selection and arrangement of components shown in FIG. 1 and described above may be varied in numerous ways. Furthermore, the ways in which fluid (e.g., steam, air, condensate, etc.) is communicated throughout a system (10) may be varied in numerous ways. For instance while the system (10) shown in FIG. 1 has a corrugator (20) being fed directly from main steam supply line (12), it will be appreciated that a variety of components (e.g., means for reducing or increasing pressure) may be provided between main steam supply line (12) and corrugator (20). Another merely illustrative variation of system (10) will be described in greater detail below with reference to FIG. 2. Other variations will be apparent to those of ordinary skill in the art in view of the teachings herein.

FIG. 2 shows an alternative system (100). This system (100) also includes a corrugator (20), whose components are the same as those described above with reference to FIG. 1, and which may be subjected to any desired modifications such as those described above or otherwise. Corrugator (20) will therefore not be described in greater detail here. System (100) also includes a stand-alone pre-heater (54). Stand-alone pre-heater (54) in this example is the same as the stand-alone pre-heater (54) described above with reference to FIG. 1, and may be subject to any desired modifications such as those described above or otherwise. Stand-alone pre-heater (54) will also therefore not be described in greater detail here. Similarly, system (100) includes a plurality of steam traps (58), just as system (10) described above with reference to FIG. 1.

The architecture for fluid communication in system (100) is also very similar to the architecture for fluid communication in system (10), and may be subjected to any desired modifications such as those described above or otherwise. However, system (100) lacks third line (70) in this example. Instead, pre-conditioner line (76) and pre-heater line (82) each branch off from first line (60). Another difference between system (10) and system (100) is that system (100) lacks a differential pressure controller (50) and pressure control valve (52). Furthermore, without fourth line (72) being present in system (100), pre-heater branch (66) simply terminates in stand-alone pre-heater (54). In other words, steam output of corrugating rolls (30, 40) is not used to feed other rolls in system (100) of this example. Of course, several other variations may be provided, including but not limited to providing another steam load to stand-alone pre-heater (54) and/or routing steam from corrugating rolls (30, 40) elsewhere.

Yet another difference between system (10) and system (100) is that system (100) includes a steam trap assembly (110) along tenth line (92), which communicates from stand-alone pre-heater (54) to sixth line (80). Steam trap assembly (110) may be used to accelerate flow through corrugating rolls (30, 40) and/or stand-alone pre-heater (54). For instance, steam trap assembly (110) may be used to control the flow out of stand-alone pre-heater (54). Another one of many possible variations of system (100) may include routing the output of steam trap assembly (110) directly to main return line (14), such as via a dedicated return line between steam trap assembly (110) and main return line (14). Similarly, any other component(s) described herein may have a direct return line to main return line (14) (e.g., bypassing sixth line (80)).

In this example, steam trap assembly (110) comprises a steam trap (58) and a bypass pathway (112). Steam trap assembly (110) may also include a vent, though like other components described herein, a vent is merely optional and not required. Bypass pathway (112) of the present example comprises piping components supporting a flow control device. The flow control device may include a valve, orifice, some combination of components that would create the same effect as an orifice, or any other components. By way of example only, an orifice nipple or orifice plate may be installed in the bypass pathway (112) to allow some portion of the flow out of the stand-alone pre-heater (54) (or some other "heat sink" vessel) to bypass the steam trap (58). The bypass pathway (112) may provide a continuous flow into the sixth line (80) without being interrupted by the steam trap (58).

To the extent that a bypass pathway (112) includes an orifice component, the orifice component may be installed with or without valves installed in series, or in any other suitable arrangement. The order of the components in a bypass pathway (112) is not critical. Suitable materials of construction may include any that are compatible with steam service at the desired operating pressure and temperature. The size of an orifice in a bypass pathway (112) may vary based on the specific conditions of a given installation. By way of example only, an orifice in a bypass pathway (112) may have a diameter anywhere between approximately $\frac{9}{64}$ inch, inclusive, and approximately $\frac{19}{128}$ inch, inclusive. Of course, any other suitable orifice diameter falling within any other suitable range may be used. The diameter of an orifice in a bypass pathway (112) may also be selectively variable, using any suitable structures or components to provide such selective variability. Such selective variability may include selective variation of orifice diameter to various selected diameters within a range of diameters, beyond merely opening and closing the orifice.

By way of example only, a solenoid valve or other powered valve may be installed in a bypass pathway (112), and may be operable to selectively open or close the bypass pathway (112) via a remote signal. Such a remote signal may be triggered by a manual switch, flow rate sensor, pressure sensor, and/or other controller. Such a configuration may permit a bypass pathway (112) to be selectively opened or closed based on operating conditions or other considerations. For instance, a bypass pathway (112) may be opened while a system (100) is under a relatively heavy load and closed during an idle period. As another merely illustrative example, a bypass pathway (112) may be opened periodically to purge or flush out any excess condensate. Still other suitable types of valves or other components that may be used in a bypass pathway (112), and methods of operating such valves or other components, will be apparent to those of ordinary skill in the art in view of the teachings herein.

Other flow control devices that may be used in a bypass pathway (112) may include an assortment of valves (e.g., needle, globe, gate, ball, etc.), any form of orifice (e.g., orifice plate, orifice nipple, orifice union, venturi nozzle, etc.), or a group of components joined in such a manner that flow would be decreased enough to avoid system performance problems. For instance, in some settings, too high of a flow rate may lead to poor heat transfer in the process while too low a flow rate may impede condensate removal. In another embodiment, a steam trap (58) is modified to have a venturi tube with an increased diameter in lieu of providing a bypass pathway (112) around the steam trap (58). Alternatively, a bypass pathway (112) may be integrated into a steam trap (58), such that a bypass pathway (112) and steam trap (58) are not provided as separate components. Still other suitable components and arrangements for a bypass pathway (112) will be apparent to those of ordinary skill in the art in view of the teachings herein. It will also be appreciated that a bypass pathway (112) may be omitted altogether. Furthermore, a steam trap (58) or any other component described herein may be omitted or substituted as desired.

In an exemplary use of either system (10, 100), paper or other materials may be fed between corrugating rolls (30, 40). Longitudinal ridges extending along corrugating rolls (30, 40) may corrugate such paper or other materials as such paper is fed through corrugating rolls. For instance, a medium paper may be fed between corrugating rolls (30, 40) to produce flutes in the medium paper. A liner paper may then be adhered to or otherwise associated with a fluted medium paper (e.g., as part of a corrugated cardboard forming process). Corrugating rolls (30, 40) may be rotationally driven by one or more electric motors connected through a shaft with or without u-joints and/or gears or transmissions, or by belts, chains, pulleys, etc. Heated belt rolls (23) may transfer heat energy to belt (25), which may itself apply substantially even pressure to corrugating roll (30). Such even pressure may keep paper in even contact with corrugating rolls (30, 40) while also raising the temperature of such paper. Alternatively, systems (10, 100) may be used in any other ways desired.

In some versions, systems (10, 100) are focused on maintaining sufficient flow through corrugating rolls (30, 40) so that productivity and efficiency are maximized at all operating conditions. It will be appreciated, however, that variations of the exemplary designs may provide similar results and/or that other results may be obtained using the exemplary design or variations thereof.

In some versions of systems (10, 100), a pressure differential across corrugating rolls (30, 40) of approximately 38 psig is maintained. Alternatively, the pressure differential across corrugating rolls (30, 40) may be less than or equal to approximately 38 psig, inclusive. Alternatively, the pressure differential across corrugating rolls (30, 40) may be less than or equal to approximately 30 psig, inclusive. Alternatively, the pressure differential across corrugating rolls (30, 40) may be less than or equal to approximately 10 psig, inclusive. Alternatively, the pressure differential across corrugating rolls (30, 40) may be between approximately 5 psig, inclusive, and approximately 40 psig, inclusive; between approximately 30 psig, inclusive, and approximately 40 psig, inclusive; between approximately 25 psig, inclusive, and approximately 35 psig, inclusive; between approximately 20 psig, inclusive, and approximately 30 psig, inclusive; or between approximately 10 psig, inclusive, and approximately 25 psig, inclusive; or between approximately 5 psig, inclusive, and approximately 15 psig, inclusive. Alternatively, any other suitable pressure differential across corrugating rolls (30, 40), falling within any suitable range, may be used.

Either system (10, 100) described herein may be configured to maintain a pressure level of at least approximately 150 psig, inclusive, throughout components within system (10, 100). Alternatively, either system (10, 100) described herein may be configured to maintain a pressure level of at least approximately 155 psig, inclusive, throughout components within system (10, 100). Alternatively, either system (10, 100) described herein may be configured to maintain a pressure level of at least approximately 160 psig, inclusive, throughout components within system (10, 100). Alternatively, either system (10, 100) described herein may be configured to maintain a pressure level of at least approximately 165 psig, inclusive, throughout components within system (10, 100). Of course, any other suitable pressure falling within any suitable range may be used, including but not limited to those below approximately 150 psig, inclusive.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the present invention should be considered in terms of whatever claims recite the invention, and is understood not to be limited to the details of structure and operation shown and described in the description.

What is claimed is:

1. A system configured to process steam, wherein the system comprises:

(a) a steam supply line, wherein the steam supply line is configured to communicate steam;

(b) a corrugator system in fluid communication with the steam supply line, wherein the corrugator system comprises a first corrugating roll and a second corrugating roll, wherein each of the first corrugating roll and the second corrugating roll have a plurality of bores formed therethrough, wherein the bores extend substantially longitudinally through the first and second corrugating rolls;

(c) a heat sink in fluid communication with the corrugator system, wherein the heat sink is configured to draw steam through the corrugator system via a pressure differential when the corrugator system is under a load;

(d) one or more return lines, wherein the one or more return lines are in fluid communication with one or both of the corrugator system or the heat sink, wherein the one or more return lines are configured to receive condensate communicated from one or both of the corrugator system or the heat sink;

(e) a first steam trap in fluid communication with the heat sink, wherein the first steam trap is positioned between the heat sink and a first return line; and (f) a bypass associated with the first steam trap, wherein the bypass comprises a bypass pathway operable to selectively bypass the first steam trap and communicate with the same first return line.

2. The system of claim 1, further comprising:

(a) a differential pressure controller, wherein the differential pressure controller is in fluid communication with the steam supply line along a first line, wherein the first line is further in fluid communication with the first corrugating roll; and (b) a pressure control valve, wherein the pressure control valve is in fluid communication with the steam supply line, wherein the pressure control valve is further in fluid communication with the corrugator system and the heat sink via a second line, wherein the differential pressure controller is further in fluid communication with the second line.

3. The system of claim 1, wherein the corrugator system further comprises an integral pre-heater, wherein the integral pre-heater is in fluid communication with the steam supply line.

4. The system of claim 1, wherein the heat sink further comprises a heated belt roll, wherein the heated belt roll is in fluid communication with the steam supply line.

5. The system of claim 1, wherein the corrugator system further comprises an integral pre-conditioner, wherein the integral pre-conditioner is in fluid communication with the steam supply line.

6. The system of claim 1, wherein the heat sink comprises a stand-alone pre-heater.

7. The system of claim 6, wherein the pre-heater comprises a roll having a diameter of approximately 36 inches or approximately 42 inches.

8. The system of claim 1, wherein the bypass has a bypass input and a bypass output, wherein the first steam trap has a first steam trap input and a first steam trap output, wherein the bypass input is positioned between the heat sink and the first steam trap input, wherein the bypass output is positioned between the first steam trap output and at least one of the one or more return lines.

9. The system of claim 1, wherein the bypass comprises a single bypass pathway and a flow control element, wherein the flow control element is disposed along the single bypass pathway and is operable to control fluid flow through the bypass between a bypass input and a bypass output, wherein the first steam trap is disposed between the bypass input and the bypass output.

10. The system of claim 9, wherein the flow control element comprises an orifice.

11. The system of claim 10, wherein the orifice has a diameter between approximately $\frac{9}{64}$ inch, inclusive, and approximately $\frac{19}{128}$ inch, inclusive.

12. The system of claim 9, wherein the flow control element comprises a plurality of valves in series.

13. The system of claim 9, wherein the flow control element comprises a solenoid, wherein the solenoid is operable to selectively control fluid flow through the bypass.

14. The system of claim 13, wherein the solenoid is operable via a remote signal.

15. The system of claim 9, wherein the flow control element comprises a controller operable to automatically control fluid flow through the bypass based at least in part on operating conditions within the system.

16. The system of claim 1, wherein the system is configured to provide a pressure differential from the first corrugating roll to the second corrugating roll between approximately 10 psig, inclusive, and approximately 39 psig, inclusive.

17. The system of claim 1, wherein the heat sink is configured to draw steam through the bores.

18. A system configured to process steam, wherein the system comprises:

(a) a steam supply line, wherein the steam supply line is configured to communicate steam;

(b) a corrugator system in fluid communication with the steam supply line, wherein the corrugator system comprises a first corrugating roll and a second corrugating roll, wherein each of the first corrugating roll and the second corrugating roll have a plurality of bores formed therethrough;

(c) a heat sink in fluid communication with the corrugator system, wherein the heat sink is configured to draw steam through the corrugator system;

(d) one or more return lines, wherein the one or more return lines are in fluid communication with one or both of the corrugator system or the heat sink, wherein the one or more return lines are configured to receive condensate communicated from one or both of the corrugator system or the heat sink; and (e) a steam trap assembly in fluid communication with and downstream of the heat sink, wherein the steam trap assembly is positioned between the heat sink and a first return line of the one or more return lines, wherein the steam trap assembly comprises a steam trap and a bypass line operable to selectively bypass the steam trap and communicate with the same first return line, wherein both the stream trap and the bypass line are downstream of the heat sink.

19. A system configured to process steam, wherein the system comprises:

(a) a steam supply line, wherein the steam supply line is configured to communicate steam;

(b) a corrugator system in fluid communication with the steam supply line, wherein the corrugator system comprises a first corrugating roll and a second corrugating roll, wherein each of the first corrugating roll and the second corrugating roll have a plurality of bores formed therethrough;

(c) a heat sink in fluid communication with the corrugator system, wherein the heat sink is configured to draw steam through the corrugator system;

(d) one or more return lines, wherein the one or more return lines are in fluid communication with one or both of the corrugator system or the heat sink, wherein the one or more return lines are configured to receive condensate communicated from one or both of the corrugator system or the heat sink; and (e) a steam trap assembly in fluid communication with and downstream of the heat sink, wherein the steam trap assembly is positioned between the heat sink and at least one of the one or more return lines, wherein the steam trap assembly comprises a steam trap and a bypass line operable to selectively bypass the steam trap, wherein the bypass line comprises a bypass input and a bypass output, wherein the bypass input is upstream of the steam trap and the bypass output is downstream of the steam trap.

20. The system of claim 19, wherein the steam trap assembly is associated with a first return line such that steam trap, the bypass input, and the bypass output directly communicate with and are disposed on the first return line.

* * * * *